US011314789B2

(12) United States Patent
Goldfarb (10) Patent No.: US 11,314,789 B2
(45) Date of Patent: Apr. 26, 2022

(54) SYSTEM AND METHOD FOR IMPROVED ANOMALY DETECTION USING RELATIONSHIP GRAPHS

(71) Applicant: Verint Systems Ltd., Herzliya Pituach (IL)

(72) Inventor: Eithan Goldfarb, Ness Ziona (IL)

(73) Assignee: COGNYTE TECHNOLOGIES ISRAEL LTD., Pituach (IL)

( * ) Notice: Subject to any disclaimer, the term of this patent is extended or adjusted under 35 U.S.C. 154(b) by 9 days.

(21) Appl. No.: 16/833,762

(22) Filed: Mar. 30, 2020

(65) Prior Publication Data

US 2020/0320106 A1 Oct. 8, 2020

(30) Foreign Application Priority Data

Apr. 4, 2019 (IL) .......................................... 265849

(51) Int. Cl.
*G06F 16/00* (2019.01)
*G06F 16/28* (2019.01)
(Continued)

(52) U.S. Cl.
CPC ............ *G06F 16/288* (2019.01); *G06F 16/29* (2019.01); *G06F 16/9024* (2019.01)

(58) Field of Classification Search
CPC ............... G06F 16/9024; G06F 21/552; G06F 11/0706; G06F 11/0709; G06F 11/0751;
(Continued)

(56) References Cited

U.S. PATENT DOCUMENTS 9,256,663 B2 2/2016 Bhatia et al.
2007/0299798 A1 12/2007 Suyama et al.
(Continued)

FOREIGN PATENT DOCUMENTS

| KR | 1020180081444 | 7/2018 |
| WO | 2018/128403 | 7/2018 |
| WO | 2019/060327 | 3/2019 |

OTHER PUBLICATIONS

Chen, Y-C, et al., "Event Detection using Customer Care Calls," Proceedings of the IEEE International Conference on Computer Communications (INFOCOM), 2013, pp. 1690-1698.
(Continued)

*Primary Examiner* — Shyue Jiunn Hwa
(74) *Attorney, Agent, or Firm* — ISUS Intellectual Property PLLC; Anthony Jason Mirabito (57) ABSTRACT

An anomaly-detection system that gathers information relating to the relationships between entities and represents these relationships in a graph that interconnects each pair of related entities. The graph may represent a computer network, in which each node corresponds to a respective device in the network and each edge between two nodes indicates that the devices represented by the nodes exchanged communication with one another in the past. the system monitors each of the entities in the graph, by continually computing a single-entity anomaly score (SEAS) for the entity. If the SEAS exceeds a first threshold the system generates an alert. Otherwise, the system checks whether the SEAS exceeds a second, lower threshold. If so, the system computes a subgraph anomaly score (SAS) for the entity's subgraph. If the SAS exceeds a SAS threshold, an alert is generated. By computing the SAS in this manner resources are conserved.

15 Claims, 5 Drawing Sheets

(51) Int. Cl.
  *G06F 16/29* (2019.01)
  *G06F 16/901* (2019.01)
(58) Field of Classification Search
  CPC .............. G06F 11/0778; G06F 11/079; G06F
      16/2455; G06F 16/34; G06F 16/38; G06F
      21/566; G06F 21/577; G06F 11/07; G06F
      11/3006; G06F 11/3086; G06F 11/3438;
      G06F 11/3452; G06F 16/215; G06F
      16/2465; G06F 16/26; G06F 16/288;
      G06F 16/3329; G06F 16/90328; G06F
      16/9535; G06F 17/30873; G06F 21/31;
      G06F 2201/81; G06F 2201/875; G06F
      2209/5011; G06F 2209/508; G06F
      2216/03; G06F 2221/2145; G06F 40/10;
      G06F 40/295; G06F 40/30; G06F 40/58;
      G06F 9/30156; G06F 9/5038; G06F
      9/505; G06F 21/554; G06F 21/55; G06F
      21/56; G06F 21/561; G06F 21/568; G06F
      21/57; G06F 11/00
  See application file for complete search history.

(56) References Cited

U.S. PATENT DOCUMENTS

| | | | |
|---|---|---|---|
| 2013/0246386 | A1 | 9/2013 | Gherman et al. |
| 2014/0222476 | A1 | 8/2014 | Romano |
| 2014/0280621 | A1 | 9/2014 | Bourdaillet et al. |
| 2015/0047026 | A1 | 2/2015 | Neil et al. |
| 2018/0018686 | A1 | 1/2018 | Wood et al. |
| 2018/0048661 | A1 | 2/2018 | Bird et al. |
| 2018/0091539 | A1 | 3/2018 | Marquardt et al. |
| 2018/0248904 | A1* | 8/2018 | Villella ............... H04L 63/1425 |
| 2018/0316704 | A1 | 11/2018 | Durairaj et al. |
| 2019/0132224 | A1* | 5/2019 | Verma ................. H04L 43/062 |

OTHER PUBLICATIONS

Isbister, T., "Anomaly detection on social media using ARIMA models," Thesis, Uppsala Universitet, 2015, 38 pages.
Jiang, N., "Perplexity Vs Cross-entropy," retrieved on Oct. 2, 2020 from https://jiangnanhugo.github.io/2016/perplexity-vs-cross-entropy, 2016, 3 pages.
Mäkinen, M. S., "Deep Learning for Anomaly Detection in Linux System Log," Thesis, Aalto University School of Science, 2019, 61 pages.
Wang, Z., et al. "Automatic Model Selection for Anomaly Detection," IEEE Computer Society, TrustCom-BigDataSE-ISPA, 2016, pp. 276-283.
Adams, R., et al., "Bayesian Online Changepoint Detection," arXiv preprint arXiv:0710.3742, 2007, 7 pages.
Ahmad, S., et al., "Unsupervised real-time anomaly detection for streaming data," Neurocomputing, vol. 262, 2017, pp. 134-147.
Aktolga, E., et al., "Detecting Outlier Sections in US Congressional Legislation," Proceedings of the 34th International ACM SIGIR Conference on Research and Development in Information Retrieval, 2011, pp. 235-244.
Allen, L., et al., "On Twitter Purge: A Retrospective Analysis of Suspended Users," Association for the Advancement of Artificial Intelligence, 2020, 8 pages.
"Anomaly Detection: Numenta Anomaly Benchmark," Machine Intelligence Technology, 2017, 7 pages.
Brownlee, J., "How to Check if Time Series Data is Stationary with Python," retrieved on Dec. 13, 2019 at https://machinelearningmastery.com/time-series-data-stationary-python, 2016, 51 pages.
Buck, C., et al., "N-gram Counts and Language Models from the Common Crawl," Proceedings of the Ninth International Conference on Language Resources and Evaluation (LREC), 2014, pp. 3579-3584.
Chandola, V., et al., "Anomaly Detection: A Survey," ACM Computing Surveys, vol. 41, No. 3, Article 15, 2009, 58 pages.
Cheung, Y.-W., et al., "Lag Order and Critical Values of the Augmented Dickey-Fuller Test," Journal of Business & Economic Statistics, vol. 13, No. 3, 1995, pp. 277-280.
Choudhary, S., et al., "Sparse Decomposition for Time Series Forecasting and Anomaly Detection," Proceedings of the SIAM International Conference on Data Mining, 2018, pp. 522-530.
Cleveland, R.B., et al., "STL: A Seasonal-Trend Decomposition Procedure Based on Loess," Journal of Official Statistics, vol. 6, No. 1, 1990, pp. 3-73.
Danescu-Niculescu-Mizil, C., et al., "No Country for Old Members: User Lifecycle and Linguistic Change in Online Communities," Proceedings of the 22nd International Conference on World Wide Web, 2013, pp. 307-318.
"Datastream.io," Mentat Innovations, retrieved on Jan. 6, 2020 from https://blog.ment.ai/datastream-io-4863db7286b7, 2017, 2 pages.
Forsyth, E., et al., "The NPS Chat Corpus," retrieved on Apr. 21, 2020 at http://faculty.nps.edu/cmartell/NPSChat.htm, 2019, 2 pages.
Freeman, C., et al., "Experimental Comparison of Online Anomaly Detection Algorithms," The 32nd International Florida Artificial Intelligence Research Society Conference (Flairs-32), 2019, pp. 364-369.
Fulton, C., "Estimating time series models by state space methods in Python: Statsmodels," http://www.chadfulton.com/fulton_statsmodels, 2017, 78 pages.
Grave, E., et al., "Unbounded cache model for online language modeling with open vocabulary," 31$^{st}$ Conference on Neural Information Processing Systems (NIPS), 2017, pp. 6042-6052.
Guthrie, D., et al., "An Unsupervised Approach for the Detection of Outliers in Corpora," Statistics, 2008, pp. 3409-3413.
Guthrie, D., "Unsupervised Detection of Anomalous Text," Thesis, 2008, 186 pages.
Herath, J.D., et al., "RAMP: Real-Time Anomaly Detection in Scientific Workflows," IEEE International Conference on Big Data (Big Data), 2019, pp. 1367-1374.
Hochenbaum, J., et al., "Automatic Anomaly Detection in the Cloud Via Statistical Learning," arXiv preprint arXiv:1704.07706, 2017, 13 pages.
Hyndman, R.J., et al., "Automatic Time Series Forecasting: The forecast Package for R," Journal of Statistical Software, vol. 27, Issue 3, 2008, 22 pages.
Inouye, D., et al., "A Review of Multivariate Distributions for Count Data Derived from the Poisson Distribution," Computational Statistics, vol. 9, No. 3, 2017, 40 pages.
Jain, S., et al., "Characterizing and Detecting Livestreaming Chatbots," IEEE/ACM International Conference on Advances in Social Networks Analysis and Mining, 2019, pp. 683-690.
Jozefowicz, R., et al., "Exploring the Limits of Language Modeling," arXiv preprint, 2016, 11 pages.
Kannan, R., et al., "Outlier Detection for Text Data," 15th Proceedings of the 2017 SIAM International Conference on Data Mining, 2017, pp. 489-497.
Kenter, T., et al., "Short Text Similarity with Word Embeddings," Proceedings of the 24$^{th}$ ACM International Conference on Information and Knowledge Management, 2015, pp. 1411-1420.
Keshvani, A., "How to use the Autocorrelation Function (ACF)?," https://coolstatsblog.com/2013/08/07/how-to-use-the-autocorreaction-function-acl, 2013, 2 pages.
Kowalska, K., et al., "Maritime Anomaly Detection using Gaussian Process Active Learning," IEEE 15$^{th}$ International Conference on Information Fusion, 2012, pp. 1164-1171.
Kulick, J., "Bayesian change-point detection," https://github.com/hildensia/bayesian_changepoint_detection, 2016, 1 page.
Laptev, N., et al., "Generic and Scalable Framework for Automated Time-series Anomaly Detection," Proceedings of the 21th ACM SIGKDD International Conference on Knowledge Discovery and Data Mining, 2015, pp. 1939-1947.
Lata, L., et al., "A Comprehensive Survey of Fraud Detection Techniques," International Journal of Applied Information Systems, vol. 10, No. 2, 2015, pp. 26-32.

(56) References Cited

OTHER PUBLICATIONS

Lavin, A., et al., "Evaluating Real-time Anomaly Detection Algorithms—the Numenta Anomaly Benchmark," IEEE 14th International Conference on Machine Learning and Applications (ICMLA), 2015, pp. 38-44.

Lili, C., "Research of E-commerce Supply Chain Management with CreditRisk + model," International Conference on Management of e-Commerce and e-Government, 2012, 3 pages.

Linden, M., "Testing Growth Convergence with Time Series Data—a non-parametric approach," International Review of Applied Economics, vol. 14, Issue 3, 2000, pp. 361-370.

Liu, S., et al., "Online Conditional Outlier Detection in Nonstationary Time Series," Proceedings of the International Florida AI Research Society Conference. Florida AI Research Symposium, HHS Public Access, 2017, 15 pages.

Liu, D., et al., "Opprentice: Towards Practical and Automatic Anomaly Detection Through Machine Learning," Proceedings of the 2015 Internet Measurement Conference (ACM), 2015, pp. 211-224.

Lowe, R., et al., "The Ubuntu Dialogue Corpus: A Large Data Set for Research in Unstructured Multi-Turn Dialogue Systems," Proceedings of the SIGDIAL 2015 Conference, 2015, pp. 285-294.

Madrid, F., et al., "Efficient and Effective Labeling of Massive Entomological Datasets," IEEE International Conference on Data Science and Advanced Analytics (DSAA), 2019, 9 pages.

"Media Bias Fact Check," NowThis News, retrieved on Apr. 21, 2020 at https://mediabiasfactcheck.com/nowthis-news/, 2019, 5 pages.

Mueen, A., et al., "The Fastest Similarity Search Algorithm for Time Series Subsequences under Euclidean Distance and Correlation Coefficient," retrieved on May 27, 2020 at http://www.cs.unm.edu/~mueen/FastestSimilaritySearch.html, 2017, 3 pages.

"NAB: The Numenta Anomaly Benchmark," retrieved on Apr. 24, 2020 at https://qithub.com/numenta/NAB, 2018, 5 pages.

Norvig, P., "How to Write a Spelling Corrector," retrieved on May 27, 2020 at https://norvig.com/spell-correct.html, 2007, 10 pages.

Phua, C., et al., A Comprehensive Survey of Data Mining-based Fraud Detection Research, arXiv preprint arXiv:1009.6119, 2010, 14 pages.

Prusher, I, "Parkland Mourns. Tragedy Strikes a Florida Community," Time, 2018, 7 pages.

Robertson, S., et al., "The Probabilistic Relevance Framework: BM25 and Beyond," Foundations and Trends in Information Retrieval, vol. 3, No. 4, 2009, pp. 333-389.

Rodriguez, J., "Poisson Models for Count Data," Acesso, vol. 10, No. 2, 2007, 14 pages.

Salvatier, J., et al., "Probabilistic Programming in Python using PyMC3," PeerJ Computer Science, 2016, 20 pages.

Saurav, S., et al., "Online Anomaly Detection with Concept Drift Adaptation using Recurrent Neural Networks," Proceedings of the ACM India Joint International Conference on Data Science Management of Data, 2018, pp. 78-87.

Savage, D., et al., "Anomaly Detection in Online Social Networks," Social Networks, vol. 39, No. 1, 2014, pp. 62-70.

Schreiber, J, "Pomegranate: fast and flexible probabilistic modeling in python," The Journal of Machine Learning Research, vol. 18, No. 1, 2017, pp. 5992-5997.

Seabold, S., et al., "Statsmodels: Econometric and Statistical Modeling with Python," Proceedings of the $9^{th}$ Python in Science Conference (SCIPY), 2010, 57 pages.

Shaoul, C., et al., A reduced redundancy USENET corpus (2005-2011), Westbury Lab Web Site, retrieved on Apr. 21, 2020 at http://www.psych.ualberta.ca/~westburylab/downloads/usenetcorpus.download.html, 2013, 2 pages.

Singh, N., et al., "Demystifying Numenta Anomaly Benchmark," IEEE International Joint Conference on Neural Networks (IJCNN), 2017, pp. 1570-1577.

Sordoni, A., et al., "A Neural Network Approach to Context-Sensitive Generation of Conversational Responses," arXiv:1506.06714v1, 2015, 11 pages.

Steyn, H. "On the multivariate poisson normal distribution," Journal of the American Statistical Association, vol. 71, No. 353, 1976, pp. 233-236.

Tatbul, N., et al., "Precision and Recall for Time Series," $32^{nd}$ Conference on Neural Information Processing Systems (NeurIPS), 2018, 11 pages.

Taylor, S., et al., "Forecasting at Scale," PeerJ Preprints, 2017, pp. 37-45.

Vallis, O., et al., "A Novel Technique for Long-Term Anomaly Detection in the Cloud," HotCloud, 2014, 6 pages.

Xia, Y., et al., "NIL is Not Nothing: Recognition of Chinese Network Informal Language Expressions," Proceedings of the $4^{th}$ SIGHAN Workshop on Chinese Language Processing, 2005, 8 pages.

Yamanishi, K., et al., "On-line Unsupervised Outlier Detection Using Finite Mixtures with Discounting Learning Algorithms," Data Mining and Knowledge Discovery, vol. 8, No. 3, 2004, pp. 275-300.

Zhu, L., et al., "Deep and Confident Prediction for Time Series at Uber," IEEE International Conference on Data Mining Workshops (ICDMW), 2017, 8 pages.

Zhuang, H., et al., "Identifying Semantically Deviating Outlier Documents," Proceedings of the 2017 Conference on Empirical Methods in Natural Language Processing, 2017, pp. 2748-2757.

International Search Report and Written Opinion, dated May 14, 2020, received in connection with corresponding International Patent Application No. PCT/IB2020/053026.

Kelly, S., et al., "Propagating Disaster Warnings on Social and Digital Media," International Conference on Pervasive Computing, 2015, pp. 475-484.

Banerjee, A., et al., "Anomaly Detection: A Tutorial," SIAM Conference on Data Mining, 2008, 103 pages.

Hawkins, J., et al., "Hierarchical Temporal Memory including HTM Cortical Learning Algorithms," Numenta, 2011, 68 pages.

Hodge, V., et al., "A Survey of Outlier Detection Methodologies," Artificial Intelligence Review, vol. 22, No. 2, 2004, pp. 85-126.

Hyndman, R. J., "Anomalous time-series R Package," retrieved on Nov. 5, 2020 from https://github.com/robjhyndman/anomalous, 2018, 3 pages.

Keogh, E., et al., "Hot SAX: Efficiently Finding the Most Unusual Time Series Subsequence," The $5^{th}$ IEEE International Conference on Data Mining (ICDM), 2005, pp. 440-449.

"Luminol," LinkedIn, retrieved on Nov. 5, 2020 from https://github.com/linkedin/luminol, 2018, 9 pages.

Morgan, A., et al., "Anomalyzer: Probabilistic anomaly detection for time series data," Lytics, retrieved on Nov. 4, 2020 from https://github.com/lytics/anomalyzer, 2015, 4 pages.

"Skyline," Etsy, retrieved on Nov. 5, 2020 from https://github.com/etsy/skyline, 2015, 5 pages.

"Surus," Netflix, retrieved on Nov. 5, 2020 from https://github.com/Netflix/Surus, 2015, 3 pages.

* cited by examiner

SYSTEM AND METHOD FOR IMPROVED ANOMALY DETECTION USING RELATIONSHIP GRAPHS

FIELD OF THE DISCLOSURE

The present disclosure relates to anomaly detection, which may be applied to cybersecurity and to other fields.

BACKGROUND OF THE DISCLOSURE

Savage, David, et al., "Anomaly detection in online social networks," Social Networks 39 (2014): 62-70 characterizes anomalies in online social networks as being either static or dynamic and as being labeled or unlabeled, and surveys methods for detecting these different types of anomalies. The reference suggests that the detection of anomalies in online social networks is composed of two sub-processes: the selection and calculation of network features, and the classification of observations from this feature space. The reference further provides an overview of the types of problems that anomaly detection can address, and identifies key areas for future research.

SUMMARY OF THE DISCLOSURE

There is provided, in accordance with some embodiments of the present invention, a system for monitoring a plurality of entities. The system includes a communication interface and a processor. The processor is configured to obtain a graph that represents the entities by respective nodes and, via multiple edges, interconnects each pair of the nodes that represents a respective pair of the entities that are related to one another. The processor is further configured to receive behavior-indicating data via the communication interface, and, based on the behavior-indicating data, to compute respective single-entity anomaly scores (SEASs) for the entities, each of the SEASs quantifying a first degree to which first behavior of a respective one of the entities is anomalous. The processor is further configured to, in response to any particular one of the SEASs, for any particular one of the entities, exceeding a predefined SEAS threshold, identify a subgraph of the graph, which represents a subset of the entities that includes the particular one of the entities, and compute a subgraph anomaly score (SAS) that quantifies a second degree to which second behavior of the subset of the entities is anomalous. The processor is further configured to, in response to the SAS exceeding a predefined SAS threshold, generate an alert.

In some embodiments, the processor is configured to obtain the graph by:
identifying each pair of the entities that are related to one another, and
in response to identifying each pair of the entities that are related to one another, constructing the graph.

In some embodiments, the processor is configured to identify each pair of the entities that are related to one another based on the pair having communicated with one another.

In some embodiments, behavior selected from the group of behaviors consisting of: the first behavior and the second behavior includes communication-related behavior.

In some embodiments, behavior selected from the group of behaviors consisting of: the first behavior and the second behavior includes location-related behavior.

In some embodiments, behavior selected from the group of behaviors consisting of: the first behavior and the second behavior includes multiple types of behavior.

In some embodiments,
the first behavior is of one or more first types,
the second behavior is of one or more second types, and
a first set of types consisting of the first types is different from a second set of types consisting of the second types.

In some embodiments, the entities are respective devices in a computer network.

In some embodiments, behavior selected from the group of behaviors consisting of: the first behavior and the second behavior includes computational behavior.

In some embodiments, the entities are respective persons.

In some embodiments, behavior selected from the group of behaviors consisting of: the first behavior and the second behavior includes financial behavior.

In some embodiments, the particular one of the entities is represented by a particular one of the nodes, and the subgraph includes each one of the nodes that is connected to the particular one of the nodes via N or fewer of the edges and excludes each one of the nodes that is connected to the particular one of the nodes via more than N of the edges, N being a positive integer.

In some embodiments,
the particular one of the entities is represented by a particular one of the nodes,
the subgraph is an SAS subgraph, and
the processor is further configured to, prior to identifying the SAS subgraph:
designate one or more of the entities as entities of interest (EOIs), which are represented in the graph by respective EOI-nodes of the nodes,
identify multiple EOI subgraphs of the graph, each of the EOI subgraphs corresponding to a respective one of the EOIs and including the EOI-node representing the respective one of the EOIs,
ascertain that the particular one of the nodes belongs to a particular one of the EOI subgraphs, and
in response to the ascertaining, compare the particular one of the SEASs to the predefined SEAS threshold.

In some embodiments,
each of the EOI subgraphs includes each one of the nodes that is connected to the EOI-node representing the respective one of the EOIs via M or fewer of the edges, and excludes each one of the nodes that is connected to the EOI-node representing the respective one of the EOIs via more than M of the edges, M being a first positive integer,
the particular one of the EOI subgraphs corresponds to a particular one of the EOIs, which is represented in the graph by a particular one of the EOI-nodes, and
the SAS subgraph includes each one of the nodes that is connected to the particular one of the EOI-nodes via N or fewer of the edges and excludes each one of the nodes that is connected to the particular one of the EOI-nodes via more than N of the edges, N being a second positive integer.

In some embodiments, N is selected from the group of positive integers consisting of: one, and two.

In some embodiments, M is equal to N.

In some embodiments,
the processor is further configured to:
compute respective other SASs for a plurality of other subgraphs of the graph, and
identify a number of the other SASs that exceed the predefined SAS threshold, and the processor is configured to generate the alert in response to the number.

There is further provided, in accordance with some embodiments of the present invention, a method for monitoring a plurality of entities. The method includes obtaining a graph that represents the entities by respective nodes and, via multiple edges, interconnects each pair of the nodes that represents a respective pair of the entities that are related to one another. The method further includes receiving behavior-indicating data and, based on the behavior-indicating data, computing respective single-entity anomaly scores (SEASs) for the entities, each of the SEASs quantifying a first degree to which first behavior of a respective one of the entities is anomalous. The method further includes, in response to any particular one of the SEASs, for any particular one of the entities, exceeding a predefined SEAS threshold, identifying a subgraph of the graph, which represents a subset of the entities that includes the particular one of the entities, and computing a subgraph anomaly score (SAS) that quantifies a second degree to which second behavior of the subset of the entities is anomalous. The method further includes, in response to the SAS exceeding a predefined SAS threshold, generating an alert.

There is further provided, in accordance with some embodiments of the present invention, a computer software product including a tangible non-transitory computer-readable medium in which program instructions for monitoring a plurality of entities are stored. The instructions, when read by a processor, cause the processor to obtain a graph that represents the entities by respective nodes and, via multiple edges, interconnects each pair of the nodes that represents a respective pair of the entities that are related to one another. The instructions further cause the processor to receive behavior-indicating data and, based on the behavior-indicating data, compute respective single-entity anomaly scores (SEASs) for the entities, each of the SEASs quantifying a first degree to which first behavior of a respective one of the entities is anomalous. The instructions further cause the processor to, in response to any particular one of the SEASs, for any particular one of the entities, exceeding a predefined SEAS threshold, identify a subgraph of the graph, which represents a subset of the entities that includes the particular one of the entities, and compute a subgraph anomaly score (SAS) that quantifies a second degree to which second behavior of the subset of the entities is anomalous. The instructions further cause the processor to, in response to the SAS exceeding a predefined SAS threshold, generate an alert.

The present disclosure will be more fully understood from the following detailed description of embodiments thereof, taken together with the drawings, in which:

DETAILED DESCRIPTION OF EMBODIMENTS

Overview

In general, the process of anomaly detection involves collecting large amounts of data related to the behavior of one or more entities, and then identifying data items that deviate significantly from the rest of the data. For example, by monitoring a device in a computer network over a period of time, data related to the communication-related behavior of the device—such as, for example, the average daily volume of traffic communicated from the device to an external server—may be obtained. Subsequently, if the behavior of the device substantially differs from the norm—for example, if a spike in the daily outgoing traffic volume is observed—an alert may be generated.

It is generally challenging to perform anomaly detection. On the one hand, if the threshold for the alert is set too high, significant anomalies may be missed, i.e., the number of false negatives may be too high. On the other hand, if the threshold is set too low, the number of false positives may be too high.

To address this challenge, embodiments of the present disclosure capitalize on the observation that, in general, anomalous behavior exhibited across a group of related entities is more statistically significant than anomalous behavior exhibited by a single entity. For example, in a computer network, a spike in the volume of traffic communicated to an external server from each device in a group of interconnected devices is more likely to indicate a malware infection, relative to a spike for only a single device. In view of this observation, a relatively high anomaly threshold is set for each entity in isolation, while a lower threshold is set for groups of related entities. This technique reduces the number of false positives that are generated, without significantly increasing the number of false negatives.

To implement this technique, an anomaly-detection system gathers information relating to the relationships between various entities, and represents these relationships in a graph that interconnects each pair of related entities. For example, the system may construct a graph, representing a computer network, in which each node corresponds to a respective device in the network, and each edge between two nodes indicates that the devices represented by the nodes exchanged communication with one another in the past. The edge may be weighted, e.g., in accordance with the frequency of the past communication, and/or in accordance with the volume of traffic that was exchanged. Subsequently, the system defines a respective subgraph for each particular entity, each subgraph including all other entities that are connected to the particular entity via N or fewer edges. For example, the system may define a two-degree subgraph, which includes all other entities connected to the particular entity by one or two edges.

It is noted that, for convenience, the present description may refer to an entity as belonging to a graph or to a subgraph, rather than stating that the entity is represented by a node belonging to the graph or to the subgraph.

Subsequently, the system monitors each of the entities in the graph, by continually computing a single-entity anomaly score (SEAS) for the entity. If the SEAS exceeds a first SEAS threshold, which is relatively high, the system generates an alert. Otherwise, the system checks whether the SEAS exceeds a second, lower SEAS threshold. If yes, the system computes a subgraph anomaly score (SAS) for the entity's subgraph. If the SAS exceeds a SAS threshold, an alert is generated. Advantageously, by computing the SAS only if the SEAS exceeds the second SEAS threshold, significant computing resources may be conserved.

In some embodiments, to conserve computing resources even further, the comparison of the SEAS to the second SEAS threshold is performed only if the entity to which the SEAS belongs is an entity of interest (EOI) or belongs to the subgraph of an EOI. An example of an EOI in a computer network is a device that is known to have communicated with a malicious server, or a device that is known to have been infected with malware in the past.

For the purpose of triggering the comparison to the second SEAS threshold as described above, the subgraph of the EOI may be smaller than the subgraph that is used for the SAS computation. For example, in response to the entity for which the SEAS was computed belonging to the one-degree subgraph of an EOI, the comparison of the SEAS to the second SEAS threshold may be performed. If the SEAS exceeds the second SEAS threshold, the SAS may then be computed for the two-degree subgraph of the entity.

In some embodiments, subsequently to ascertaining that an SAS for a particular subgraph exceeds the SAS threshold, the system computes respective other SASs for a plurality of other subgraphs, and identifies the number of these other SASs that exceed the SAS threshold. The system may then generate an alert in response to the number.

For example, based on the number of other SASs that exceed the SAS threshold, the system may compute the percentage of subgraphs whose SAS exceeds the SAS threshold, and compare this percentage to a particular predefined threshold, which may be, for example, between 10% and 25%. Alternatively, as further described below with reference to FIG. 4, the system may simply compare the number of other SASs that exceed the SAS threshold to a predefined threshold number. If the threshold is not exceeded, the system may generate an alert. On the other hand, if threshold is exceeded—indicating that the anomalous behavior is widespread—the system may refrain from generating an alert.

System Description

Figure 1:
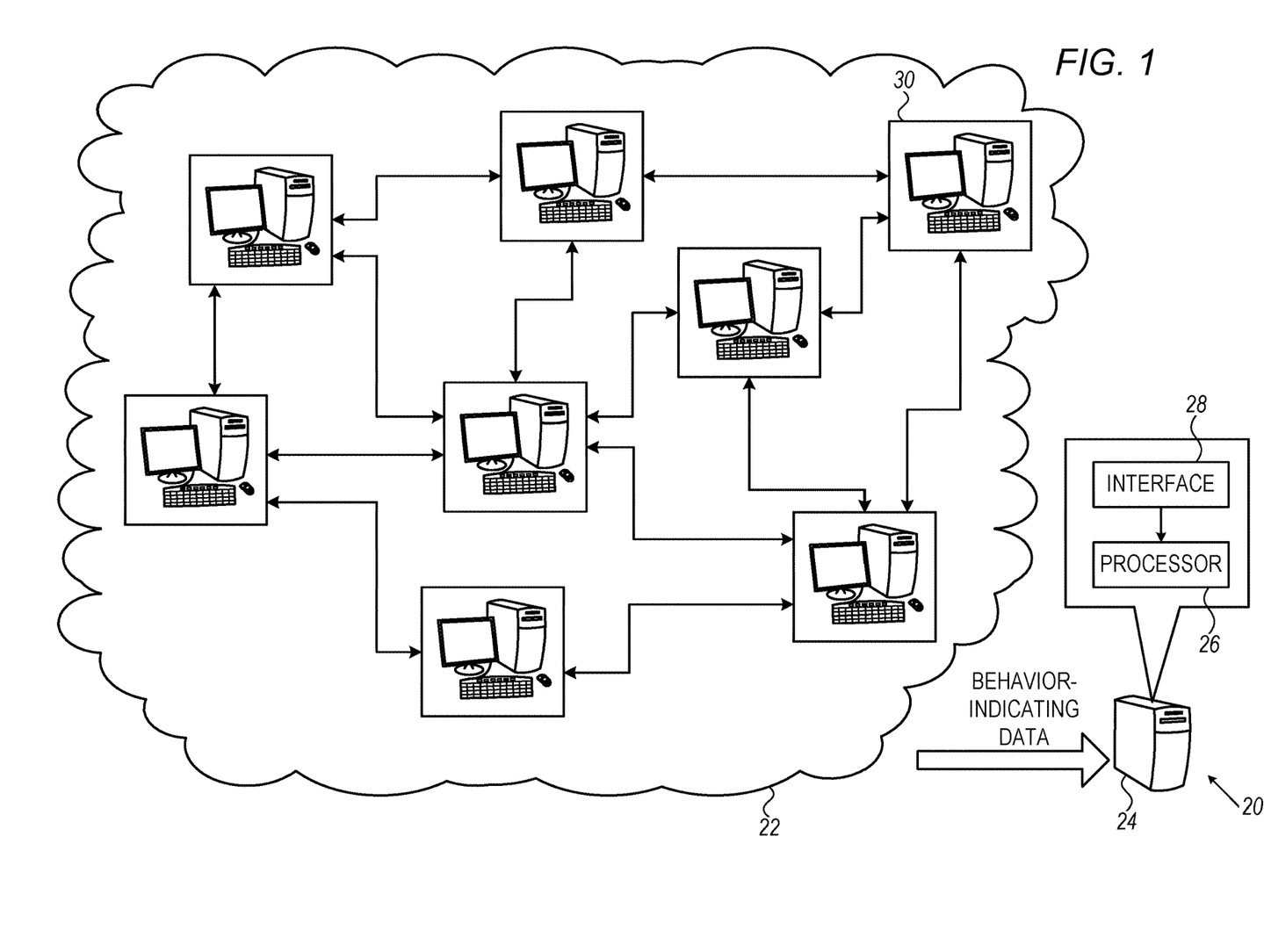
FIG. 1 is a schematic illustration of a system for detecting anomalies, in accordance with some embodiments of the present disclosure.

Reference is initially made to FIG. 1, which is a schematic illustration of a system 20 for detecting anomalies, in accordance with some embodiments of the present disclosure.

FIG. 1 depicts a computer network 22, such as a local area network (LAN), to which multiple devices 30 belong. Devices 30 communicate with each other over wired and/or wireless connections, as depicted in FIG. 1 by double-sided arrows. Devices 30 may further communicate with other devices located externally to network 22.

System 20 comprises at least one server 24, comprising a processor 26 and a communication interface 28, such as a network interface controller (NIC). Processor 26 receives, via communication interface 28, behavior-indicating data relating to the behavior of devices 30. Based on the behavior-indicating data, the processor identifies anomalous behavior in the network, as described in detail below.

Typically, the behavior-indicating data indicate communication-related behavior of devices 30. For example, the behavior-indicating data may include a traffic-flow feed that specifies for each device, for each communication session in which the device participated, the start time and end time of the communication session, the Internet Protocol (IP) address of any other device that participated in the communication session, the volume of data that was communicated to the device during the session, and the volume of data that was communicated from the device during the session. Such a feed may have any suitable form, and may be acquired using any suitable technique. For example, processor 26 may receive a NetFlow™ feed from a router, a switch, or another device in network 22. Alternatively or additionally, one or more traffic-flow sensors located in network 22 may communicate respective traffic-flow feeds to the processor.

Alternatively or additionally, the behavior-indicating data may indicate computational behavior of devices 30. For example, respective security agents installed on devices 30 may communicate a feed, such as an Event Detail Record, specifying computational activities performed by each device 30, including, for example, file-generating activities and file-modification activities, such as changes to the device's registry. Alternatively or additionally, the behavior-indicating data may indicate location-related behavior of devices 30. For example, any of the location-tracking techniques described below with reference to FIG. 3 may be used to track the location of a mobile device belonging to network 22.

In general, processor 26 may be embodied as a single processor, or as a cooperatively networked or clustered set of processors. In some embodiments, the functionality of processor 26, as described herein, is implemented solely in hardware, e.g., using one or more Application-Specific Integrated Circuits (ASICs) or Field-Programmable Gate Arrays (FPGAs). In other embodiments, the functionality of processor 26 is implemented at least partly in software. For example, in some embodiments, processor 26 is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Figure 2:
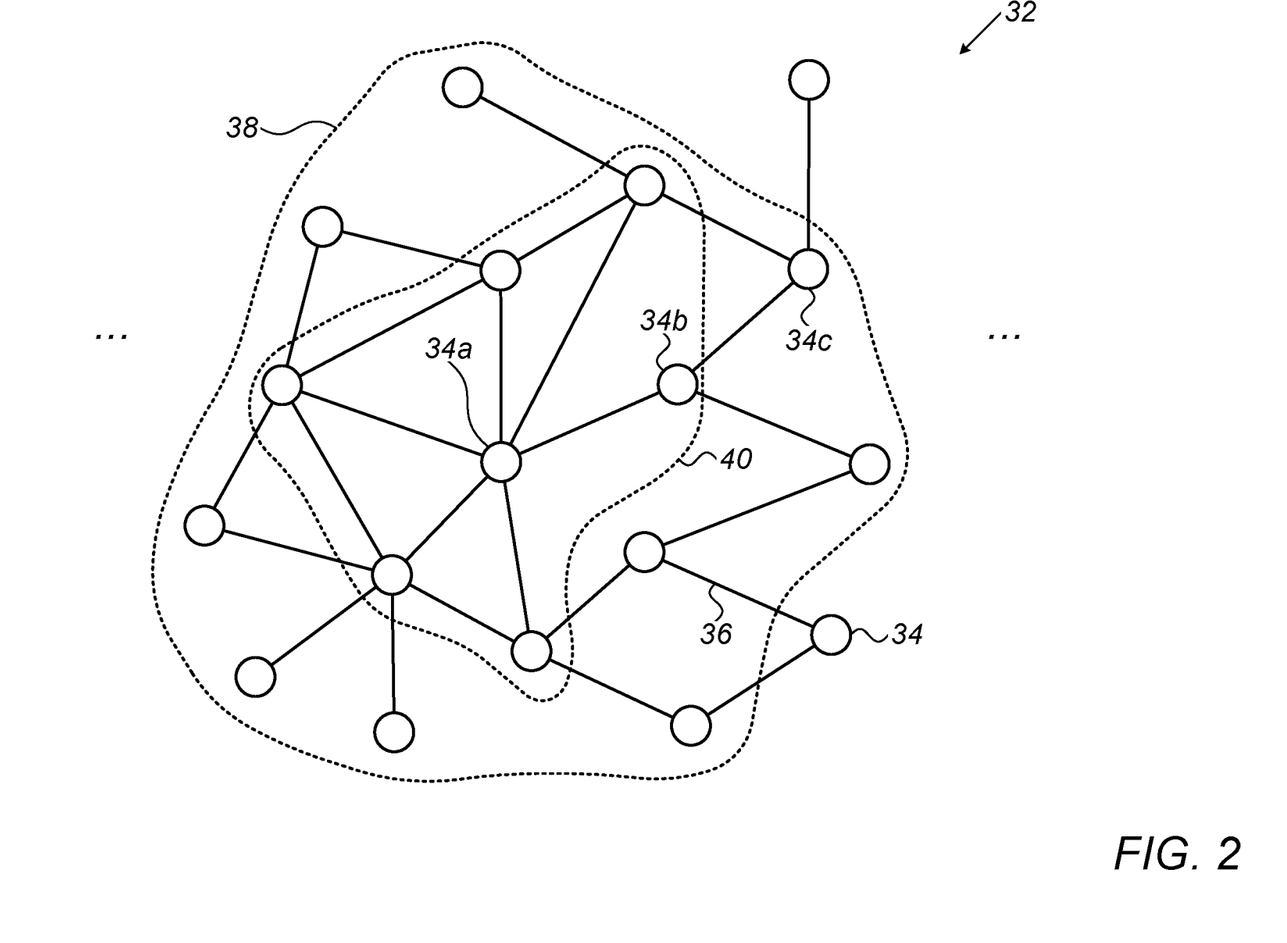
FIG. 2 is a schematic illustration of a graph used for anomaly detection, in accordance with some embodiments of the present disclosure.

Reference is now additionally made to FIG. 2, which is a schematic illustration of a graph 32 used for anomaly detection, in accordance with some embodiments of the present disclosure.

Graph 32 represents devices 30 by respective nodes 34, and, via multiple edges 36, interconnects each pair of nodes 34 that represents any pair of devices that are related to one another, e.g., by virtue of having communicated with one another. Processor 26 is configured to obtain graph 32 and, as described in detail below, use graph 32 to detect behavioral anomalies in network 22.

In some embodiments, the processor obtains graph 32 by constructing graph 32. For example, based on the received behavior-indicating data, processor 26 may identify pairs of devices 30 that are related to one another, e.g., based on each of the pairs having communicated with one another. The processor may then construct graph 32 responsively thereto. Thus, for example, in response to identifying that a first device communicated with a second device, the processor may define an edge that connects a first node 34a, which represents the first device, to a second node 34b, which represents the second device.

In some embodiments, even one instance of communication between two devices (e.g., within a certain preceding time period) renders these devices related to one another for the purposes of graph 32, such that the graph includes an edge that interconnects the respective nodes representing the two devices. In other embodiments, the devices are considered related to one another only if the number of instances of communication between the two devices (e.g., within a certain preceding time period) exceeds a particular threshold.

In other embodiments, the processor obtains graph 32 by receiving the graph from an external source, such as a network administrator or another network-monitoring system.

Subsequently to obtaining graph 32, the processor continues to monitor the incoming behavior-indicating data. Based on the behavior-indicating data, the processor may continually update the graph. For example, if the behavior-indicating data indicate that a new device was added to the network, the processor may add a node for the new device. Conversely, if no communication was exchanged with a particular device for a period of time, the processor may remove the device's node from the graph. Similarly, in response to a newly-related pair of devices, the processor may add the appropriate edge to the graph. Conversely, if no communication between a particular pair of devices was seen for a period of time, the processor may remove the corresponding edge from the graph.

Furthermore, based on the behavior-indicating data, the processor detects anomalous behavior in the network. In particular, for each device in the network, the processor monitors various parameters, including, for example, the volume of data exchanged between the device and any external servers and/or the number of changes that were made to the registry of the device. The processor further computes, for each device, a single-entity anomaly score (SEAS) that quantifies the degree to which the behavior of the device is anomalous with respect one or more of these parameters.

Subsequently to computing the SEAS, the processor compares the SEAS to a first, relatively-high predefined SEAS threshold. If the SEAS exceeds the first SEAS threshold—indicating that the behavior of the device is highly anomalous, and hence, that the device is likely infected by malware—the processor generates an alert. Otherwise, the processor compares the SEAS to a second, lower SEAS threshold. In some cases, the processor may first compute a different SEAS based on a different set of parameters, and then compare this new SEAS to the second SEAS threshold.

In response to the SEAS exceeding the second SEAS threshold, the processor ascertains that the behavior of the device is anomalous, indicating a possible malware infection. However, given that the second SEAS threshold is lower than the first SEAS threshold, the processor does not immediately generate an alert. Rather, the processor first performs a "sanity check," in which the processor ascertains whether other, related devices also exhibit anomalous behavior. If yes, it is likely that the device is infected, and hence, the processor generates an alert. Otherwise, the processor assumes that the anomalous behavior is due to other factors, and hence, does not generate an alert.

To perform the sanity check, the processor first identifies a subgraph of the graph that includes the particular node representing the device. This subgraph represents a subset of the devices that are most closely related to the possibly-infected device. The processor then computes a subgraph anomaly score (SAS) that quantifies the degree to which the behavior of the subset of devices is anomalous, and then compares the SAS to a predefined SAS threshold. In response to the SAS exceeding the predefined SAS threshold, the processor may generate an alert.

Typically, the subgraph includes, for a positive integer N such as one or two, each node that is connected to the particular node via N or fewer edges including the particular node itself, which is connected to itself via zero edges and excludes each node that is connected to the particular node via more than N edges.

For example, with reference to FIG. 2, supposing that the SEAS for the device represented by first node 34a exceeds the second, lower SEAS threshold, the processor may identify a subgraph 38 for node 34a having a "size" of N=2. In other words, subgraph 38 may include node 34a along with the 15 other nodes that are each connected to node 34a by one or two edges. Subsequently, the processor may compute the SAS score for the subgraph, thus quantifying the degree to which the behavior of the 16 devices represented by the subgraph is anomalous.

In some embodiments, to conserve computing resources, the processor focuses on particular devices that have a higher likelihood of being infected, such as devices that are known to have communicated with a malicious server, or are known to have been infected with malware in the past. In particular, the processor first designates these devices as entities of interest (EOIs). The processor then identifies, for each EOI, an "EOI subgraph" corresponding to the EOI and including the node that represents the EOI. Subsequently, for any particular device, the processor compares the SEAS to the second, lower SEAS threshold only if the node representing the device belongs to an EOI subgraph of an EOI.

Typically, the EOI subgraph includes, for a positive integer M such as one or two, each node that is connected to the EOI-node i.e., the node representing the EOI via M or fewer edges including the EOI-node itself, and excludes each node that is connected to the EOI-node via more than M edges. In some embodiments, M is equal to N; in other embodiments, M is less than N.

For example, with reference to FIG. 2, supposing that first node 34a is an EOI-node that represents an EOI, the processor may identify, for node 34a, an EOI-subgraph 40 having a size of M=1. In other words, EOI-subgraph 40 may include node 34a along with the six nodes that are each connected to node 34a via one edge. Subsequently, the processor may compute the SEAS for any device represented by any node in EOI-subgraph 40, such as second node 34b. In response to ascertaining that node 34b belongs to EOI-subgraph 40, the processor may compare the SEAS to the lower SEAS threshold. If the SEAS exceeds the lower SEAS threshold, the processor may compute the SAS for the subgraph of node 34b, and then, based on the SAS, decide whether to generate an alert.

Conversely, given the SEAS of any other device represented by any other node that does not belong to an EOI-subgraph, such as a third node 34c, the processor may refrain from comparing the SEAS to the second, lower SEAS threshold. Thus, provided that the SEAS does not exceed the first, higher SEAS threshold, the processor may refrain from generating an alert.

Detecting Anomalies in the Behavior of Persons

In some embodiments, system 20 is used to detect anomalies in the behavior of persons. This type of anomaly detection may be helpful, for example, for preventing or investigating instances of terrorism, money laundering, drug trafficking, smuggling, communications fraud, and other types of crime.

Figure 3:
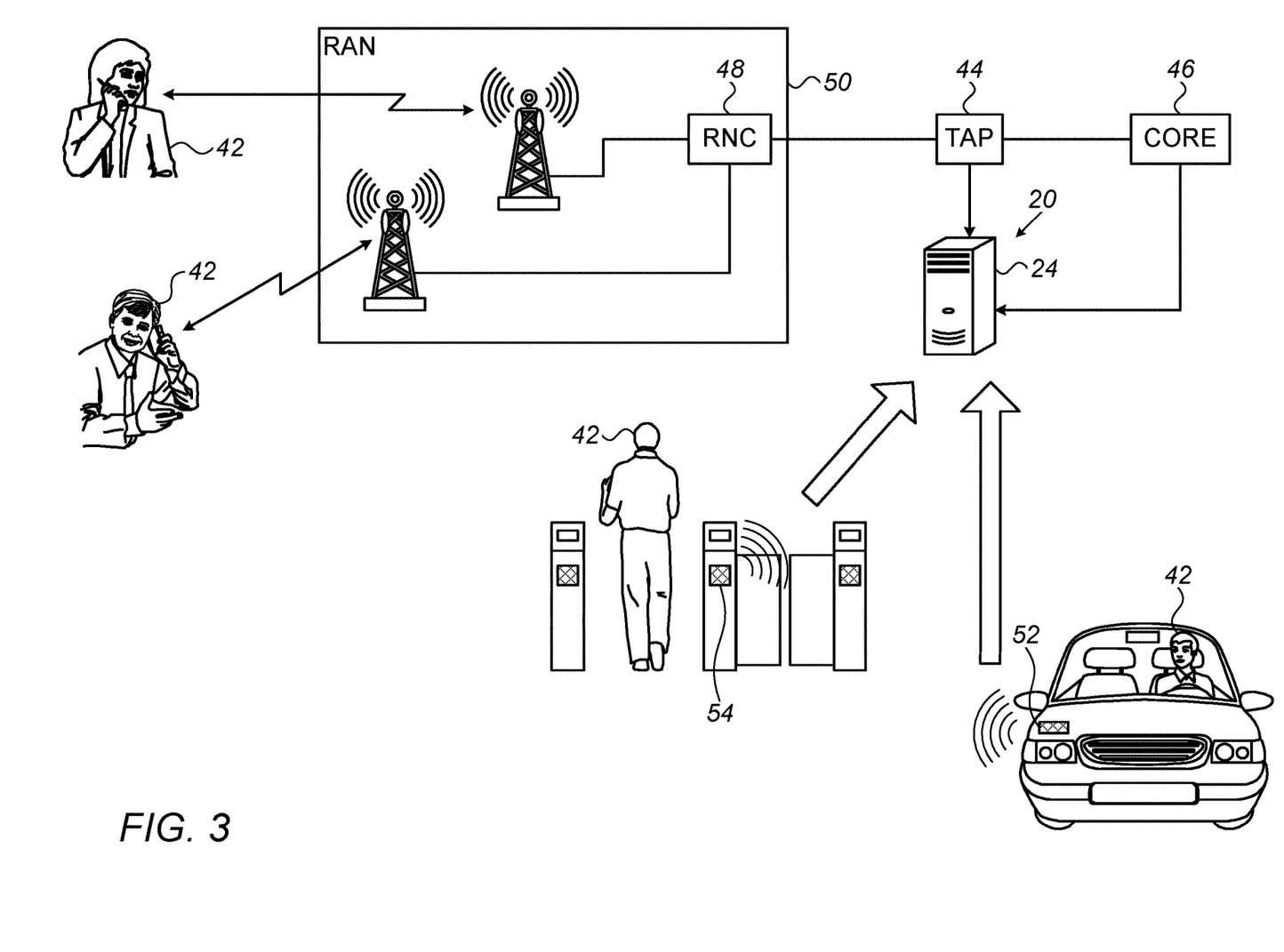
FIG. 3 is a schematic illustration of an application of the system of FIG. 1 for detecting anomalies in the behavior of persons, in accordance with some embodiments of the present disclosure.

In this regard, reference is now made to FIG. 3, which is a schematic illustration of an application of system 20 for detecting anomalies in the behavior of persons, in accordance with some embodiments of the present disclosure.

As in FIG. 1, system 20 comprises server 24, comprising a communication interface and a processor. Via the communication interface, the processor receives behavior-indicating data relating to the behavior of multiple persons 42. Based on the behavior-indicating data, the processor identifies anomalous behavior of persons 42.

In some embodiments, the behavior-indicating data received by the processor indicate communication-related behavior of persons 42. For example, the behavior-indicating data may specify, for each person, details of various communication sessions over a cellular network, the Internet, or any other network in which the person participated. Such details may include, for example, the time of the session, the duration of the session, and/or an identifier, such as a name or an Internet Protocol (IP) address, of any other party that participated in the session. Alternatively or additionally, the behavior-indicating data may specify details of various electronic messages, such as emails or text messages, which were exchanged with the person. Such details may include, for example, the time at which each message was sent or received, the size of the message, and/or an identifier of any other party that received the message.

Alternatively or additionally, the behavior-indicating data received by the processor may indicate location-related behavior of persons 42. For example, the behavior-indicating data may specify, for each person, various locations at which the person was present during a preceding period of time, and the times at which the person was present at these locations.

Alternatively or additionally, the behavior-indicating data may indicate financial behavior of persons 42. For example, the behavior-indicating data may specify bank transactions, credit card transactions, and/or money transfers that were performed by persons 42 via short message service (SMS).

In some embodiments, at least some of the aforementioned behavior-indicating data is received from a cellular network. For example, at least some of the behavior-indicating data may be contained in a feed from the billing system and/or the operations support system (OSS) of the core network 46 of the cellular network. Alternatively or additionally, at least some of the behavior-indicating data may be received from one or more network taps 44, each of which may be located within core network 46 or at any other suitable location in the network. For example, in a Universal Mobile Telecommunications System (UMTS) cellular network, a tap 44 may be located between the core network e.g., the mobile switching center (MSC) server and the radio network controller (RNC) 48 of the radio access network (RAN) 50. In a Long-Term Evolution (LTE) cellular network, a tap may be located between the serving gateway (S-GW) and the packet data network gateway (P-GW). Alternatively or additionally, a tap may be located between the serving general packet radio service (GPRS) support node (SGSN) and the gateway GPRS support node (GGSN).

The behavior-indicating data received from the cellular network may indicate communication-related behavior of persons 42, by virtue of including, for example, records of calls, SMS messages, and/or exchanges of data. Alternatively or additionally, the behavior-indicating data may indicate location-related behavior. For example, the behavior-indicating data may include parameters such as ratios of signal to interference, received signal code powers, and round trip times, from which the processor may compute (e.g., using triangulation) the locations of persons 42. Alternatively or additionally, the behavior-indicating data may indicate financial behavior, by virtue of including, for example, records of SMS-based money transfers.

Alternatively or additionally, at least some of the behavior-indicating data received by the processor may be contained in a feed from an Internet Service Provider (ISP); this feed may include, for example, billing logs. Alternatively or additionally, at least some of the behavior-indicating data may be contained in a feed from a tap that monitors Internet Protocol (IP) communication. Such a tap may be located, for example, at an ISP. Alternatively or additionally, the processor may receive traffic-flow feeds, such as a NetFlow™ feed, from a router, a switch, or another device. These feeds may indicate communication-related behavior and/or one or more other types of behavior of persons 42.

Alternatively or additionally, the processor may receive a transaction feed, indicating financial behavior, from a bank or other financial institution.

Alternatively or additionally, the processor may receive location-related data from a tracking sensor 52 located, for example, on or within a vehicle of a person, or on the clothing of the person. Each sensor 52 continually communicates the sensor's location to the processor, such that, as the sensor moves with the person, the processor may track the person's location.

Alternatively or additionally, other sensors 54, such as an imaging sensor or another type of electronic sensor located at the entrance to a particular area, may report the movement of a particular person into, or from, the area. Thus, for example, responsively to a person swiping his access card to gain entry to his place of work, a sensor 54 may report the subject's entry to the processor.

Alternatively or additionally, any other suitable techniques may be used to monitor the persons' behavior. In general, the behavior-indicating data may be received by the processor wirelessly and/or wiredly, using any suitable communication protocol, such as the Internet Protocol (IP). Communication interface 28 (FIG. 1) may comprise any suitable hardware or software elements, alternatively or additionally to a NIC, for facilitating receipt of the behavior-indicating data.

As described above with reference to FIGS. 1-2, the processor may identify, based on the received behavior-indicating data, pairs of persons that are related to one another. In response thereto, the processor may construct graph 32. In this case, each node in graph 32 represents a respective person 42, rather than a respective device. Alternatively, the processor may obtain graph 32 by receiving the graph from an external source.

A pair of persons may be related to one another by virtue of having communicated with one another, as described above with reference to FIGS. 1-2 for devices 30. Alternatively or additionally, the pair may be related by virtue of having been in the same location, e.g., for at least a threshold number of times, and/or for at least a threshold duration, in a preceding time period. Thus, for example, coworkers who work at the same location, or family members who live at the same location, may be identified as related persons. Alternatively or additionally, the pair may be related by virtue of having transacted with one another.

Further Details Regarding the Anomaly Score Computations

In general, for persons, devices, or any other entities, each of the SEAS and the SAS may be computed using any suitable function that takes, as input, any one or more parameters relating to any one or more types of behavior. The output of the function may be drawn from any suitable range of values.

In some cases, the set of behavior types on which the SEAS is based may be different from the set of behavior types on which the SAS is based. For example, the SEAS may be based on communication-related behavior, while the SAS may be alternatively or additionally based on location-related behavior.

For persons, specific examples of parameters on which an anomaly score may be based include communication-related parameters such as a ratio of incoming calls to outgoing calls, a number of international calls, parameters relating to instances of communication with parties of interest such as parties located in particular countries, and a volume of text or IP communication. Other examples include location profiles, and financial parameters such as a number of money transfers or other transactions during a particular period of time. Wherever relevant, a parameter is typically considered in relation to its mean and standard deviation, as in the examples below.

Thus, for example, an SEAS for any particular person may exceed the SEAS threshold if the person repeatedly, on work days, travels to other locations instead of going to work, remains near an international border for an unusual amount of time, exchanges an unusual volume of text or IP communication, and/or places or receives an unusual number of international calls. An SAS for any particular subgraph may exceed the SAS threshold if, for example, at least one member of the subgraph placed a call to a country of interest, and other members travelled to other locations instead of going to work, and/or went silent (i.e., stopped communicating).

For devices, specific examples of parameters include communication-related parameters, computational parameters (e.g., a number of files that were generated or modified within a preceding time period), and location-related parameters (e.g., location profiles). As a purely illustrative example, the SEAS for a device in a computer network may be computed as $a*(R-\overline{R})/\sigma_R + b*P$, where:

(i) R is a ratio of bytes outgoing from the device to bytes incoming to the device over a period of time;

(ii) $\overline{R}$ is the mean of the ratio over previous periods of time;

(iii) $\sigma_R$ is the standard deviation of the ratio over the previous periods of time;

(iv) P is 1 if a particular port was used during the period of time, and is 0 otherwise; and (v) "a" and "b" are suitable coefficients.

As another purely illustrative example, the SAS for a subgraph containing Q nodes may be computed as the binary value $(\Sigma_{i=1}^{Q}((R_i-\overline{R}_i)/\sigma_{R_i}>T)>D1)$ & $(\Sigma_{i=1}^{Q}P_i>D2)$, where $R_i$, $\overline{R}_i$, $\sigma_{R_i}$, and $P_i$ are as defined above for each $i^{th}$ node of the Q nodes, T is a suitable threshold (e.g., a number between two and three), and D1 and D2 are suitable device-number thresholds. For a binary anomaly score such as in this example, the threshold for the anomaly score is 0, such that a score of 1 exceeds the threshold.

It is noted that although, for ease of description, the language of the present disclosure assumes that the SEAS or SAS increases with the degree to which the behavior of the entity or subset of entities is anomalous, the scope of the present disclosure also includes the opposite convention. Thus, for example, an anomaly score that is increasingly negative with increasing anomalousness may be said to "exceed" a (negative) threshold if the score is less than the threshold. Similarly, an anomaly score that is positive but is increasingly smaller with increasing anomalousness may be said to "exceed" a (positive) threshold if the score is less than the threshold.

Example Algorithm

Figure 4:
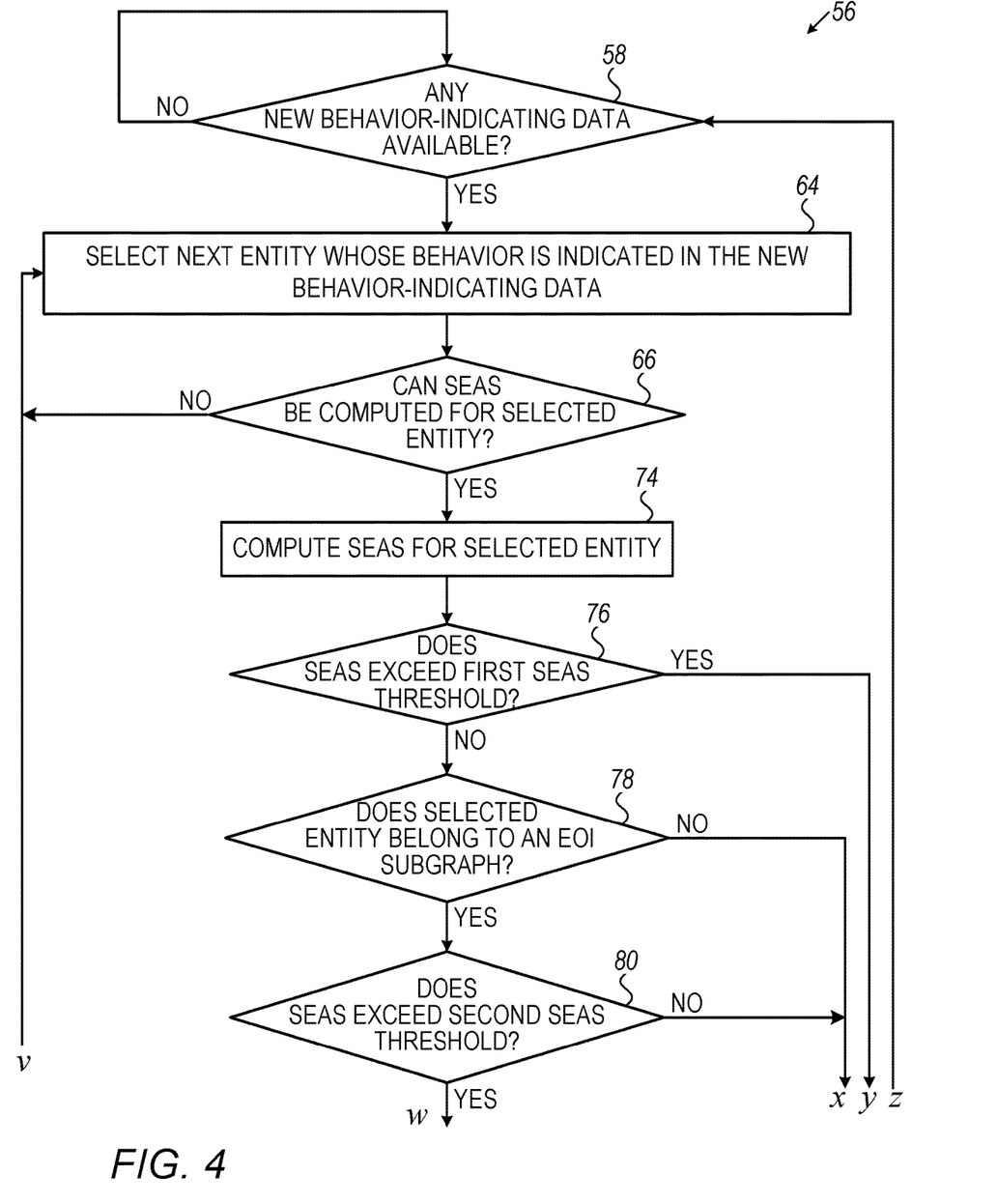
FIG. 4 is a flow diagram for an example algorithm for anomaly detection, in accordance with some embodiments of the present disclosure.

Reference is now made to FIG. 4, which is a flow diagram for an example anomaly-detection algorithm 56, in accordance with some embodiments of the present disclosure. Algorithm 56 may be executed by processor 26 to detect anomalies in the behavior of persons (as in FIG. 3), of devices in a computer network (as in FIG. 1), or of any other types of entities, such as vehicles or Internet of Things (IoT) devices.

By way of introduction, it is noted that typically, as new behavior-indicating data are continually received, anomaly-detection algorithm 56 is executed in parallel to two other algorithms, referred to herein as a graph-building algorithm and a profiling algorithm. These two algorithms, which produce output that is used by anomaly-detection algorithm 56, are hereby briefly described.

The graph-building algorithm checks the behavior-indicating data for any new pairs of related entities, and builds or updates graph 32 (FIG. 2) responsively thereto. For example, by executing the graph-building algorithm, processor 26 may add one or more nodes and/or one or more edges to the graph. Alternatively or additionally, the processor may remove at least one edge from the graph, e.g., in response to observing that no communication between a particular pair of entities took place for a relatively long period of time. Alternatively or additionally, the processor may remove at least one node from the graph, e.g., in response to not observing any activity by a particular entity for a relatively long period of time. As further described below, graph 32 is used by anomaly-detection algorithm 56 to identify anomalous behavior.

In parallel to the graph-building algorithm, based on the behavior-indicating data, the profiling algorithm continually updates behavioral profiles for single entities and for groups of entities represented by respective subgraphs. The behavioral profiles are used by anomaly-detection algorithm 56 to compute the relevant anomaly scores, and/or to establish respective thresholds for the scores. For example, the profiling algorithm may identify the distribution of the ratio of outgoing bytes to incoming bytes for a particular device over a preceding period of time, and the anomaly-detection algorithm may then use the mean and standard deviation of the distribution to ascertain whether communication-related behavior of the device is anomalous.

Turning now to the specifics of FIG. 4, algorithm 56 begins at a first checking step 58, at which the processor checks whether any new behavior-indicating data are available. Upon ascertaining that new behavior-indicating data are available, the processor, at an entity-selecting step 64, selects an entity whose behavior is indicated in the new behavior-indicating data. Next, the processor, at a third checking step 66, checks whether an SEAS can be computed for the second entity, i.e., whether the behavior-indicating data needed for the SEAS computation are available. If not—for example, if the SEAS relies on a behavioral profile relating to previous activity of the selected entity, and no such profile is available—the processor returns to entity-selecting step 64, and selects the next entity. Otherwise, the processor, at an SEAS-computing step 74, computes the SEAS for the selected entity.

Following the SEAS computation, the processor checks, at a fourth checking step 76, whether the SEAS exceeds the first, relatively high SEAS threshold. If yes, the processor generates an alert at an alert-generating step 94. Otherwise, the processor checks, at a fifth checking step 78, whether the selected entity belongs to an EOI subgraph. If yes, the processor checks, at a sixth checking step 80, whether the SEAS exceeds the second, lower SEAS threshold. If yes, the processor, at a subgraph-identifying step 82, identifies a subgraph that includes the selected entity. Subsequently, the processor computes the SAS for the subgraph, at a first SAS-computing step 84.

Following the SAS computation, the processor checks, at a seventh checking step 86, whether the SAS exceeds the SAS threshold. If yes, the processor generates an alert, provided that the behavior in the selected entity's subgraph is anomalous relative to other subgraphs in the graph. In particular, the processor first selects other subgraphs belonging to the graph, at a subgraph-selecting step 88. For example, the processor may select the (N-degree) subgraphs of some or all of the EOIs, and/or any other randomly-selected subgraphs belonging to the graph. Next, at a second SAS-computing step 90, the processor computes the SAS for each of the selected subgraphs. The processor then checks, at an eighth checking step 92, whether the SAS exceeds the SAS threshold for more than a threshold number of the selected subgraphs. If not, the processor generates an alert at alert-generating step 94.

Following alert-generating step 94, the processor checks, at a ninth checking step 96, whether the behavior of any more entities is indicated in the new behavior-indicating data. If yes, the processor returns to entity-selecting step 64, and selects the next entity for processing. Otherwise, the processor returns to first checking step 58.

Returning now to eighth checking step 92, if the SAS exceeds the SAS threshold for more than the threshold number of selected subgraphs, the processor does not generate an alert, but rather, goes immediately to ninth checking step 96. In a computer-network setting, an example scenario in which this may occur is a scenario in which an application was installed or updated on many devices in the network, causing these devices to change their behavior. In a person-monitoring setting, an example scenario is a holiday in which a large number of people change their behavior.

Similarly, the processor may refrain from generating an alert, and immediately perform ninth checking step 96, if (i) the processor ascertains, at fifth checking step 78, that the selected entity does not belong to an EOI subgraph, (ii) the processor ascertains, at sixth checking step 80, that the SEAS does not exceed the second SEAS threshold, or (iii) the processor ascertains, at seventh checking step 86, that the SAS that was computed for the selected entity's subgraph does not exceed the SAS threshold.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for monitoring a plurality of entities, the system comprising:
   a communication interface; and
   a processor, configured to:
   obtain a graph that represents the entities by respective nodes and, via multiple edges, interconnects each pair of the nodes that represents a respective pair of the entities that are related to one another;
   receive behavior-indicating data via the communication interface;
   designate one or more of the entities as entities of interest (EOIs), which are represented in the graph by respective EOI-nodes of the nodes;
   identify multiple EOI subgraphs of the graph, each of the EOI subgraphs corresponding to a respective one of the EOIs and including the EOI-node representing the respective one of the EOIs,
      wherein each of the EOI subgraphs includes each one of the nodes that is connected to the EOI-node representing the respective one of the EOIs via M or fewer of the edges, and excludes each one of the nodes that is connected to the EOI-node representing the respective one of the EOIs via more than M of the edges, M being a first positive integer, and
      wherein the particular one of the EOI subgraphs corresponds to a particular one of the EOIs, which is represented in the graph by a particular one of the EOI-nodes;
   ascertain that the particular one of the nodes belongs to a particular one of the EOI subgraphs;
   based on the behavior-indicating data, compute respective single-entity anomaly scores (SEASs) for the entities, each of the SEASs quantifying a first degree to which first behavior of a respective one of the entities is anomalous;
   in response to any particular one of the SEASs, for any particular one of the entities, wherein the particular one of the entities is represented by a particular one of the nodes, exceeds a predefined SEAS threshold;
      (i) identify a subgraph of the graph, which represents a subset of the entities that includes the particular one of the entities, wherein the subgraph is an SAS subgraph, and the SAS subgraph includes each one of the nodes that is connected to the particular one of the EOI-nodes via N or fewer of the edges and excludes each one of the nodes that is connected to the particular one of the EOI-nodes via more than N of the edges, N being a second positive integer, and
      (ii) compute a subgraph anomaly score (SAS) that quantifies a second degree to which second behavior of the subset of the entities is anomalous;
   in response to the ascertaining that the particular one of the nodes belongs to the particular one of the EOI subgraphs, compare the particular one of the SEASs to the predefined SEAS threshold; and
   in response to the SAS exceeding a predefined SAS threshold, generate an alert.

2. The system according to claim 1, wherein the processor is configured to obtain the graph by:
   identifying each pair of the entities that are related to one another, and in response to identifying each pair of the entities that are related to one another, constructing the graph.

3. The system according to claim 2, wherein the processor is configured to identify each pair of the entities that are related to one another based on the pair having communicated with one another.

4. The system according to claim 1, wherein behavior selected includes at least one of a communication-related behavior and a location-related behavior.

5. The system according to claim 1, wherein the entities are respective devices in a computer network.

6. The system according to claim 5, wherein behavior selected from the group of behaviors consisting of: the first behavior and the second behavior includes computational behavior.

7. The system according to claim 1, wherein the entities are respective persons.

8. The system according to claim 7, wherein behavior selected from the group of behaviors consisting of: the first behavior and the second behavior includes financial behavior.

9. The system according to claim 1, and wherein the subgraph includes each one of the nodes that is connected to the particular one of the nodes via N or fewer of the edges and excludes each one of the nodes that is connected to the particular one of the nodes via more than N of the edges, N being a positive integer.

10. The system according to claim 1,
wherein the processor is further configured to:
compute respective other SASs for a plurality of other subgraphs of the graph, and
identify a number of the other SASs that exceed the predefined SAS threshold, and
wherein the processor is configured to generate the alert in response to the number.

11. A method for monitoring a plurality of entities, the method comprising:
obtaining a graph that represents the entities by respective nodes and, via multiple edges, interconnects each pair of the nodes that represents a respective pair of the entities that are related to one another;
receiving behavior-indicating data;
designating one or more of the entities as entities of interest (EOIs), which are represented in the graph by respective EOI-nodes of the nodes;
identifying multiple EOI subgraphs of the graph, each of the EOI subgraphs corresponding to a respective one of the EOIs and including the EOI-node representing the respective one of the EOIs,
wherein each of the EOI subgraphs includes each one of the nodes that is connected to the EOI-node representing the respective one of the EOIs via M or fewer of the edges, and excludes each one of the nodes that is connected to the EOI-node representing the respective one of the EOIs via more than M of the edges, M being a first positive integer, and
wherein the particular one of the EOI subgraphs corresponds to a particular one of the EOIs, which is represented in the graph by a particular one of the EOI-nodes;
ascertaining that the particular one of the nodes belongs to a particular one of the EOI subgraphs;
based on the behavior-indicating data, computing respective single-entity anomaly scores (SEASs) for the entities, each of the SEASs quantifying a first degree to which first behavior of a respective one of the entities is anomalous;
in response to any particular one of the SEASs, for any particular one of the entities, wherein the particular one of the entities is represented by a particular one of the nodes, and exceeding a predefined SEAS threshold:
 (i) identifying a subgraph of the graph, which represents a subset of the entities that includes the particular one of the entities, wherein the subgraph is an SAS subgraph, and the subgraph includes each one of the nodes that is connected to the particular one of the EOI-nodes via N or fewer of the edges and excludes each one of the nodes that is connected to the particular one of the EOI-nodes via more than N of the edges, N being a positive integer, and
 (ii) computing a subgraph anomaly score (SAS) that quantifies a second degree to which second behavior of the subset of the entities is anomalous;
in response to the ascertaining, comparing the particular one of the SEASs to the predefined SEAS threshold; and
in response to the SAS exceeding a predefined SAS threshold, generating an alert.

12. The method according to claim 11, wherein obtaining the graph comprises obtaining the graph by:
identifying each pair of the entities that are related to one another, and
in response to identifying each pair of the entities that are related to one another, constructing the graph.

13. The method according to claim 12, wherein identifying each pair of the entities that are related to one another comprises identifying each pair of the entities that are related to one another based on the pair having communicated with one another.

14. The method according to claim 11, wherein behavior comprises at least one of a communication-related behavior and a location-related behavior.

15. The method according to claim 11, wherein the entities are respective devices in a computer network.

* * * * *